(12) United States Patent
Roden et al.

(10) Patent No.: US 7,395,395 B2
(45) Date of Patent: Jul. 1, 2008

(54) METHODS, SYSTEMS, AND STORAGE MEDIUMS FOR MONITORING CONSUMPTION OF STORAGE SPACE AND RELOCATING CONTENT CONTAINED IN THE STORAGE WHEN A PREDETERMINED CONDITION IS MET

(75) Inventors: Barbara J. Roden, Atlanta, GA (US); Douglas A. Bulleit, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 390 days.

(21) Appl. No.: 10/984,445

(22) Filed: Nov. 9, 2004

(65) Prior Publication Data
US 2006/0101489 A1    May 11, 2006

(51) Int. Cl.
| | |
|---|---|
| G06Q 10/00 | (2006.01) |
| G06F 12/00 | (2006.01) |
| G06F 13/00 | (2006.01) |
| G06F 13/28 | (2006.01) |
| G06F 15/16 | (2006.01) |
| G06F 7/00 | (2006.01) |
| G06F 17/30 | (2006.01) |
| H04H 60/32 | (2008.01) |
| H04N 7/16 | (2006.01) |
| H04N 7/173 | (2006.01) |
| H04K 1/00 | (2006.01) |
| H04L 9/00 | (2006.01) |

(52) U.S. Cl. .................... 711/165; 705/52; 725/14; 725/91; 725/92; 725/142; 709/219; 707/10; 707/204

(58) Field of Classification Search ............... 711/165; 725/42
See application file for complete search history.

(56) References Cited

U.S. PATENT DOCUMENTS

| | | | | |
|---|---|---|---|---|
| 5,530,557 | A * | 6/1996 | Asit et al. | 386/125 |
| 5,557,317 | A * | 9/1996 | Nishio et al. | 725/92 |
| 5,719,983 | A * | 2/1998 | Henderson et al. | 386/70 |
| 6,931,657 | B1 * | 8/2005 | Marsh | 725/46 |
| 7,088,910 | B2 * | 8/2006 | Potrebic et al. | 386/83 |
| 2002/0040475 | A1 * | 4/2002 | Yap et al. | 725/39 |
| 2003/0086023 | A1 * | 5/2003 | Chung et al. | 348/714 |
| 2003/0095791 | A1 * | 5/2003 | Barton et al. | 386/83 |
| 2004/0258390 | A1 * | 12/2004 | Olson | 386/46 |
| 2005/0155070 | A1 * | 7/2005 | Slaughter | 725/86 |
| 2005/0289617 | A1 * | 12/2005 | Safadi et al. | 725/89 |

* cited by examiner

*Primary Examiner*—Sanjiv Shah
*Assistant Examiner*—Marwan Ayash
(74) *Attorney, Agent, or Firm*—Cantor Colburn LLP

(57) ABSTRACT

Exemplary embodiments relate to methods, systems, and storage mediums for managing content storage and selection activities. The method includes monitoring consumption of storage space with respect to storage capacity in at least one content device receiving content from a content provider, relocating content contained in the storage space of the content device when a predetermined condition is met, and providing access to relocated content. The relocation is operable for freeing up the storage space of the content device.

9 Claims, 3 Drawing Sheets

METHODS, SYSTEMS, AND STORAGE MEDIUMS FOR MONITORING CONSUMPTION OF STORAGE SPACE AND RELOCATING CONTENT CONTAINED IN THE STORAGE WHEN A PREDETERMINED CONDITION IS MET

Embodiments of the invention relate generally to managing content, and more particularly, to methods, systems, and storage mediums for managing content storage and selection services over a network.

Television programming customers are currently presented with a fixed interface into their provider's available on-screen programming listings from which they make choices on programs to view. Many customers utilize personal recording devices in order to build libraries of preferred programs for recurrent or subsequent viewing. These personal recording devices offer fixed amounts of storage, thereby limiting the amount of programming that may be stored by the customer. In order to add to the library, one or more programs need to be removed or deleted from storage, or alternatively, the storage system needs to be upgraded to accommodate additional content. If the customer does not wish to upgrade, he/she may need to regularly monitor the current storage availability, particularly in light of the storage requirements of any selected programming content to be stored. This can be time consuming and burdensome for the customer. Similar disadvantages exist with other content storage devices such as computers, digital music devices, digital cameras, and personal video recorders, to name a few.

What is needed, therefore, is a way for customers to create and maintain libraries of content that are easy and convenient to access and manage without requiring upgrades to existing storage systems or the acquisition of additional storage systems.

SUMMARY OF THE INVENTION

Exemplary embodiments of the invention relate to methods, systems, and storage mediums for managing content storage and selection services over a communications network. Methods include monitoring consumption of storage space with respect to storage capacity in at least one content device receiving content from a content provider, relocating content contained in the storage space of the content device when a predetermined condition is met, and providing access to relocated content. The relocation is operable for freeing up the storage space of the content device.

Exemplary embodiments further include systems for managing content storage and selection services over a communications network. Systems include a database for storing content; an interface to at least one content device receiving content from a content provider; and a content storage and selection application for monitoring consumption of storage space of the content device with respect to storage capacity, relocating content contained in the storage space when a predetermined condition is met, and providing the content device with access to the relocated content.

Exemplary embodiments also include storage mediums encoded with machine-readable program code for providing content storage and selection services. The program code includes instructions for causing a host system to monitor consumption of storage space with respect to storage capacity in at least one content device receiving content from a content provider, relocate content contained in the storage space of the content device when a predetermined condition is met, and provide access to relocated content. The relocation is operable for freeing up the storage space of the content device.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

According to exemplary embodiments, the content storage and selection system provides content storage system monitoring, management, and off-site storage services. The content storage and selection system also facilitates the creation and management of content libraries, browsing and acquisition of content from a third-party content library or other content sources, and provides security features. The storage may apply to any type of content such as documents, text files, email, images, video, sound, music, programming, and multimedia.

Figure 1:
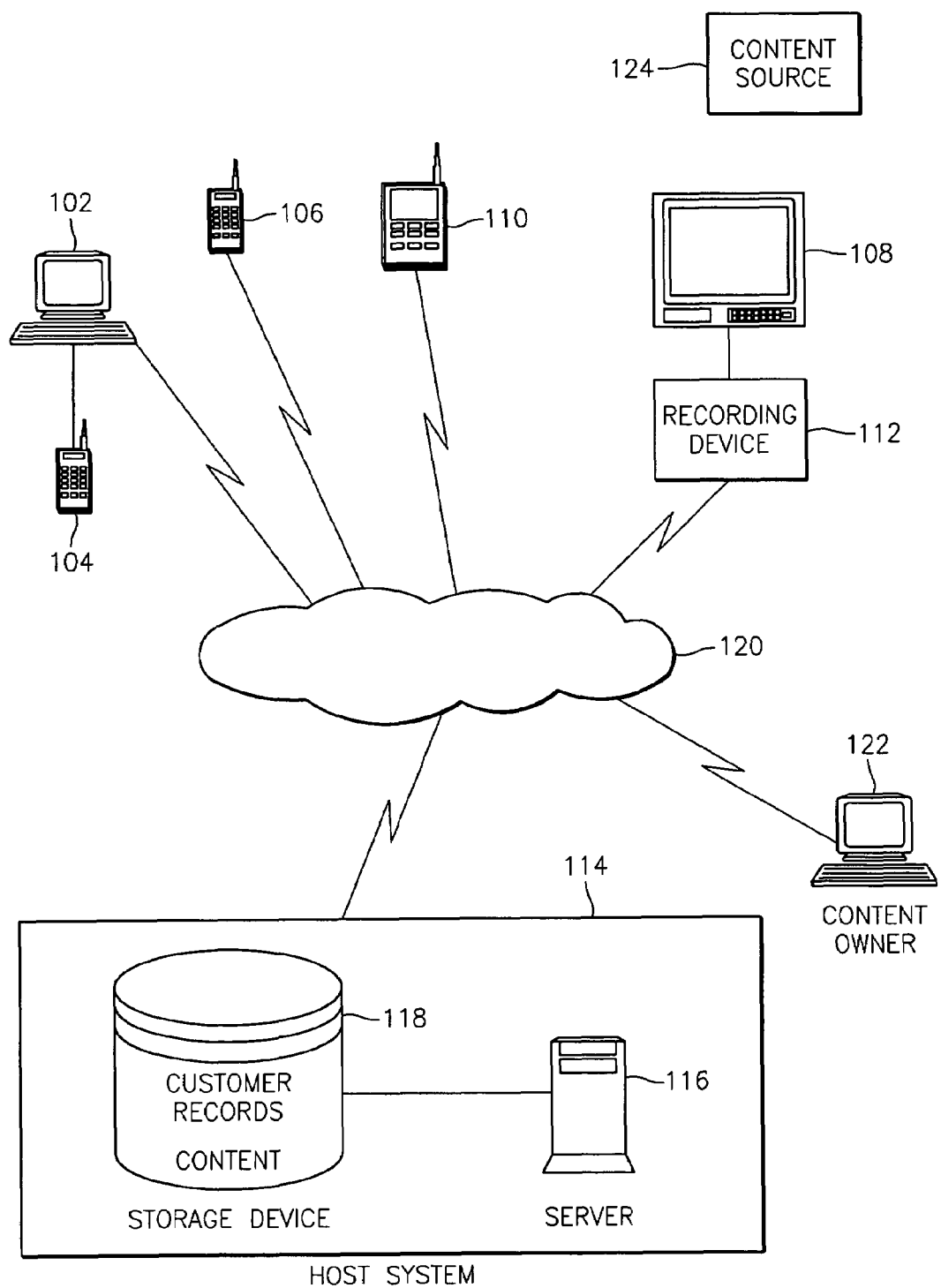
FIG. 1 is a block diagram of a system upon which the content storage and selection system may be implemented in exemplary embodiments.

Referring now to FIG. 1, a block diagram of an exemplary system for implementing the content storage and selection system is generally shown. The exemplary system of FIG. 1 includes a host system 114 in communication with content devices 102-112 via a network 120. Host system 114 refers to the entity implementing the content storage and selection services described herein. Users of content devices 102-112 may communicate with host system 114 utilizing one or a combination of communications technologies including, e.g., satellite or cellular technology, circuit-switched networking, and packet-switched networking, among others. The telecommunications infrastructure utilized for enabling communications for content devices 102-112 are well known and will be readily understood by those skilled in the art.

The term "user" as described herein, refers to one or a combination of: a consumer of content (e.g., an individual purchases a song via the Internet and downloads the song to a personal computer; an individual purchases a compact disk (CD) from a 'brick and mortar' establishment; etc.); a subscriber of content (e.g., an individual receiving cable/satellite television programming, Internet services, or other content pursuant to a subscription agreement); or a user may be the owner or originator of the content (e.g., pictures taken on a camera or cellular telephone, a composition, story, personal home video, etc.). The term "subscriber" also encompasses other users that do not actually subscribe to a content service but have access to it, such as members in the same household as the subscriber.

In accordance with exemplary embodiments, devices 102-112 as shown in FIG. 1 include a computer 102, a digital music device 104, an Internet-enabled wireless telephone 106, a television 108 in communication with a recording device 112, and a personal digital assistant (PDA) 110. Television 108 may also include a set top box (not shown) that includes, e.g., a wired or wireless remote control for enabling a customer to access the services provided by the content storage and selection system in conjunction with television set 108. Alternatively, the functionality of the set top box described above may be incorporated into the recording device 112. Television 108 may present content pursuant to a subscription agreement with, e.g., a cable television service provider, satellite television service, or may present content originating from a broadcast network or content originating from recording device 112 (e.g., personal home video).

According to exemplary embodiments, recording device 112 refers to a system that communicates with television 108 and/or the associated set top box via a wireline or wireless technology, as well as with external systems such as host system 114 via a service provider network as shown in the system of FIG. 1. Recording device 112 may receive instructions from a computer user on personal computer 102, from the set top box and/or television 108, and/or from host system 114 regarding which programs will be presented on television 108 or recorded by recorder device 112. Recorder device 112 may comprise memory (e.g., an internal hard drive or DVD drive) whereby digital programming signals are received over the communications network 120 and stored in the memory. Recording device 112 may comprise a commercial product such as TiVo™ produced by TiVo Inc. of Alviso, Calif. In alternate embodiments, recording device 112 may be incorporated in the set top box of television 108 as a single unit.

Computer 102 may comprise a desktop, laptop, or other similar general-purpose computing device known in the art. Computer 102 may include memory (e.g., floppy disk drive, hard disk drive) for storing information such as files, documents, images, audio, applications, and multimedia.

Digital music device 104 may comprise a portable digital recording and playing device such as an iPod® player by Apple Computer, Inc.® of Cupertino, Calif., or an iAUDIO M3® by Cowon Systems, Inc. of Seoul, Korea. Digital music device 104 may also store digital games, pictures, and personal data such as calendars or organizers, etc. In exemplary embodiments, digital music device 104 plays music in an audio format such as Moving Picture Experts Group Audio Level 3 (MP3), Advanced Streaming Format (ASF), or WAV. A user may download music or other content from the Internet via a computer and store it on the digital music device 104. The connection between the computer 102 and digital music device 104 may be wireline (e.g., Universal Serial Bus (USB) or may be wireless (e.g., Bluetooth™)). Accordingly, digital music device 104, as shown in the system of FIG. 1, is in communication with computer 102. Alternatively, a user may copy content from, e.g., a CD, onto computer 102 and, if desired, copy the content from the computer 102 to the digital music device 104.

Wireless telephone 106 may include memory for storing items such as voice messages, text messages, pictures, and personal information, among others. Wireless telephone 106 may communicate via a cell tower and mobile switching center (not shown), which, in turn, may communicate with other networks via a central office (not shown).

In exemplary embodiments, PDA 110 comprises a wireless computing device with networking capability such as a web browser and an Internet Service Provider subscription for allowing PDA 110 to communicate digitally with other devices. PDA 110 may include memory for storing documents, files, images, applications, messages, etc.

It will be understood that other types of content devices (e.g., digital cameras, personal video recorders, etc.) may also be serviced by the content storage and selection system in order to realize the advantages of the invention. Accordingly, the content devices 102-112 as shown in the system of FIG. 1 are provided for illustrative purposes and are not to be construed as limiting in scope.

The content devices 102-112 may include a user interface that enables a user to build and browse one or more libraries of content as described further herein. It will be understood that the form of user interface may vary from one content device to another (e.g., voice prompts and selections via key depressions may be used on a telephone, web page user interface screen for a computer user, etc.); however, in exemplary embodiments the functionality of the user interface remains the same across all content devices. The user interface may present a list of all content in the user's library on a display screen of the content device. The listing of content stored locally on the device and the content stored on the network may be integrated and displayed to the user in such a way that the actual storage location of the content (e.g., content device 102-112, storage device 118) is transparent to the user. A user may also share a 'view' of his/her library with others on another content device via the user interface.

Host system 114 provides content storage and selection system services to its customer/user base. In exemplary embodiments, host system 114 includes a server 116 that executes a content storage and selection application. Server 116 may comprise any suitable high-speed microprocessor capable of handling the volume of activities provided by the features and functions of the content storage and selection application. Server 116 may be accessed over the communications network 120 and may further include a security feature or firewall (not shown) in order to protect the integrity of the data stored within host system 114. Other security features are described further herein.

The content storage and selection application may include business rules for monitoring and removing selected content from a content device, managing the off-site network storage system, establishing and maintaining user accounts, and implementing security features as described herein. The content storage and selection application includes logic that performs functions such as determining what content will be stored locally on a user's content device and what content should be stored on the network (i.e., storage device 118). Various criteria may be utilized by the logic for making these determinations. For example, individual user preferences may be considered. Other criteria may include the total storage capacity of the content device, the available remaining storage in the content device (e.g., when 80% full, relocate content items to network storage), the length of time a particular content item has been stored in the user's library (e.g., content items stored longer than five days will be relocated to network storage), and where the content to be added to storage exceeds the available remaining storage in the content device.

The content storage and selection application may also include logic for inferentially determining how to manage content storage. For example, the logic may determine that frequently accessed content should remain in local storage on the user's content device in order to allow for quick retrieval. By monitoring users' activities conducted with respect to the users' content libraries, the content storage and selection application may identify relationships and similarities between the various libraries as well as the activities conducted therein. As a result, users may be provided with suggested or preferred content (e.g., users who purchased DVD "A", also purchased DVD "B"). This logic may be executed at host system 114 or may be shared with content devices 102-112.

In exemplary embodiments, host system 114 includes a storage device 118 that is in communication with the server 116 over a network such as a local area network, wide area network, virtual private network, etc. In accordance with exemplary embodiments, storage device 118 refers to an off-site network storage system that stores content on behalf of customers. If the host system 114 described in the system of FIG. 1 is a content provider such as a cable television enterprise, the programming content stored in storage device 118 may include, e.g., broadcast programming, cable network programming, premium channel programming, pay-per-view programming, on-demand programming, digital music, etc. Alternatively, host system 114 may also store content received from other sources. As described above, host system 114 manages the content libraries of each user. Host system 114 may also manager its own network storage. For example, host system 114 may maintain a single copy of certain content items (e.g., top ten new releases of DVDs) despite the fact that many user libraries may list the content item as being associated with each of the libraries. By doing so, network storage space can be maximized.

In exemplary embodiments, storage device 118 also stores user records. User records may include personal information relating to the user (e.g., name, address, email, telephone number, etc.), account information such as billing data, and user content libraries containing listings of content saved in storage by, or on behalf of, a user.

Also included in the system of FIG. 1 is a content owner system 122. Content owner system 122 refers to an owner of the property rights to a content item or one who possesses related property rights (licensing authority) with respect to the content item. Content owner 122 may be a business enterprise that provides content to its customers via, e.g., a service provider such as host system 114. For example, content owner 122 may provide premium channel content such as HBO® programming or Showtime® programming under a subscription agreement with its customers. Alternatively, content owner system 122 may refer to an individual, rather than an enterprise, who possesses property rights in a content item (e.g., a copyrighted composition).

A content source 124 is also included in the exemplary system of FIG. 1. Content source 124 refers to an originating source, or distribution source, of a content item. For example, content source 124 may be a cable or satellite television service provider, an Internet service provider, an online merchant, a physical 'brick and mortar' establishment that sells, broadcasts, provides access to, or distributes content.

As described above, host system 114 provides the content storage and selection system services to its user/customer base. While host system 114 is described herein as an independent entity, it will be understood that the functionality of the content storage and selection system services may be implemented by, or in conjunction with, other entities such as content owner 122 or content source 124. Additionally, the host system 114 may also include a server that aggregates content from other content providers and selects and stores the content.

Figure 2:
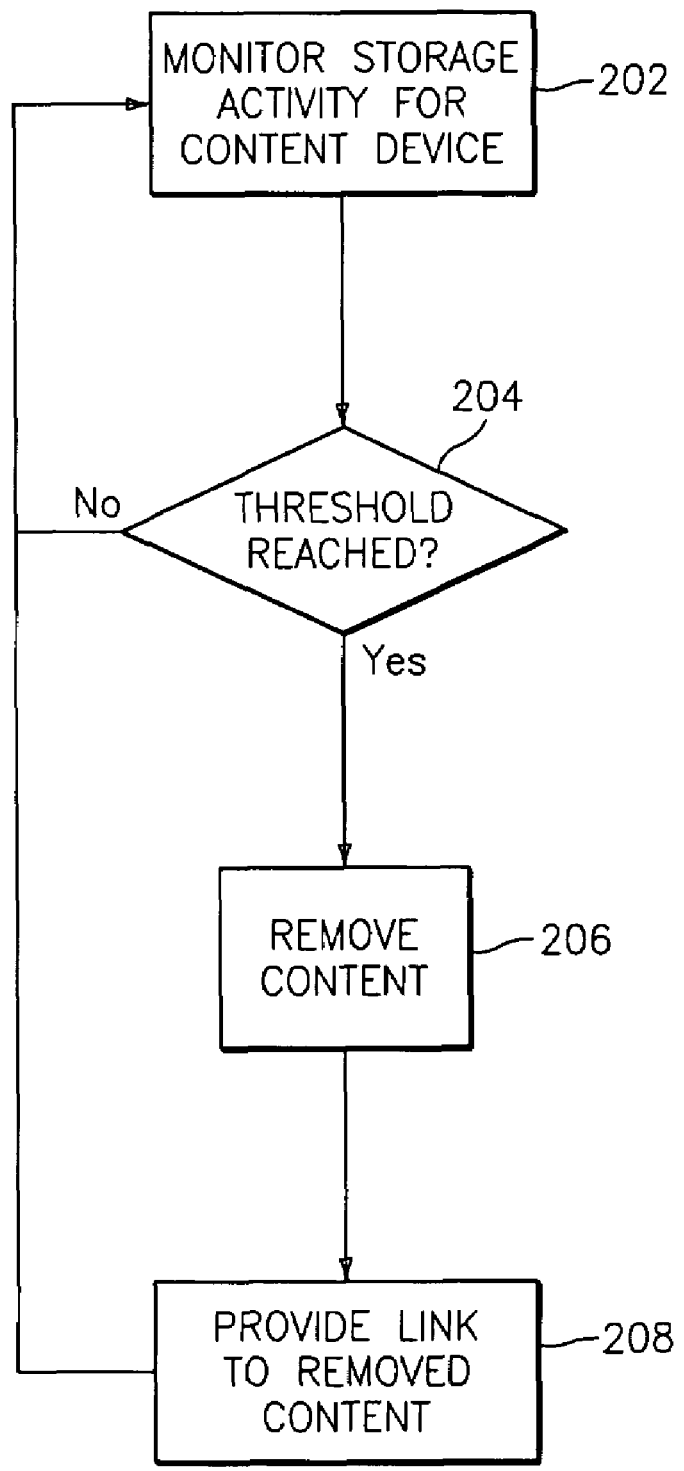
FIG. 2 is a flow diagram of a process for implementing the storage management features of the content storage and selection system in exemplary embodiments.

An exemplary process for monitoring storage activity and relocating content for a content device will now be described with respect to FIG. 2. Host system 114 monitors a customer's content device via a communications link over network 120 in accordance with the type of content device used by the customer at step 202. For example, content devices 108 and 112 may be linked to the host system via a Digital Subscriber Line (DSL). Content device 108 displays programming selected by a user either directly by channels transmitting various programming, or by a previously recorded program saved on recording device 112. These recorded programs may be listed in a customer library for quick searching and access of the content. Utilizing the DSL link to the recording device 112, host system 114 monitors the remaining available storage space in recording device 112.

As described above, business rules of the content storage and selection application may dictate when and how the customer's content in storage will be modified. These business rules may be applied in, e.g., a processor at the host system 114, at the content device, or a combination of both. For example, a content device (e.g., recording device 112) may be purged at the request of the customer, only when it reaches its full capacity, when it reaches a pre-determined threshold (e.g., 80%), only when the content to be added to storage exceeds the available remaining storage in the content device, etc.

In exemplary embodiments, if the threshold (or other criteria adopted above) has been met at step 204, the content storage and selection application removes content from the content device (or a reference to the content in the library); otherwise, the monitoring may continue at step 202. Business rules may be adopted for specifying which content materials will be purged (e.g., the oldest stored content, the largest content files, customer-selected content, least-accessed content, etc.). If the content removed does not already exist in storage device 118 of the host system 114, the content may be saved to the storage device 118. If the content removed does exist in storage device 118, then the content storage and selection application may maintain a single copy of the content that is replicated for each customer who accesses the content and who includes the content in their content library. In this manner, network storage space may be preserved.

According to exemplary embodiments, the content storage and selection application associates a link to the removed content within the user library so that the customer may continue to access the content (e.g., via a download over the network 120) at step 208. The demarcation of storage facility sources for content associated with a customer library (e.g., on-site content device storage, off-site network storage) may be imperceptible to the customer. The process returns to step 202 whereby the content storage and selection application may continue monitoring the status of the content device storage.

Figure 3:
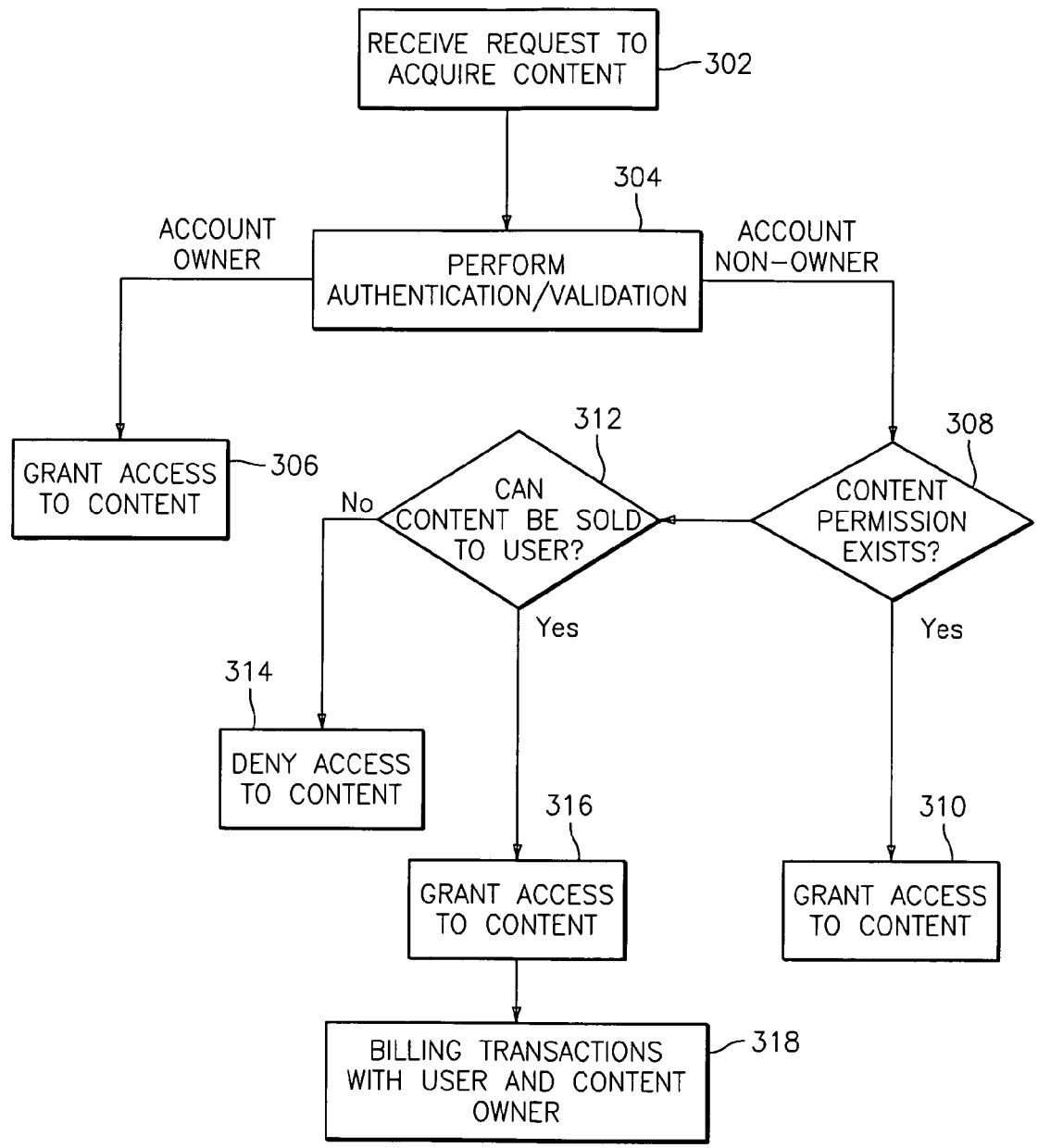
FIG. 3 is a flow diagram of a process for implementing content selection and security features of the content storage and selection system in exemplary embodiments.

As indicated above, the content storage and selection system may also provide security features and enable content sharing among customers. These features will now be described with respect to FIG. 3. According to exemplary embodiments, at step 302 a request to access content stored in storage device 118 is received at the host system 114. The content storage and selection application performs authentication and validation relating to the request at step 304. One or more security features may be utilized by the host system 114 for authenticating and validating requests for content. For example, a security feature may be directed to authenticating the individual who is requesting access to content (e.g., via a user identification and password). Another security feature may be directed to validating the user account and content device utilizing, for example, a security token. Additionally, or alternatively, a security feature may be directed to authenticating the content device from which the request was received using, e.g., an identifier associated with the content device that is retrieved over the network. Security may also be implemented by associating a customer content library with a physical transmission medium (e.g., DSL line), which would limit the content access to a fixed physical location (e.g., customer home).

In exemplary embodiments, if the authentication/validation performed at step 304 indicates that the request has been initiated by the account owner, the content storage and selection application grants access to the content associated with the account owner (e.g., content library) at step 306. If the authentication/validation indicates that the request initiated is not by the owner of the account, the content storage and selection application may check to determine whether any permissions exist to view the content at step 308. For example, the host system 114 may have placed restrictions on the acquisition or sharing of a particular content item listed in the content library such as in the case of premium programming that carry additional subscriber fees. If no restrictions exist at step 308, the content storage and selection application may grant access to the content at step 310. This step may include including a listing for the content in the requester's content library and a link to the storage device 118 for future access to the content.

Alternatively, the content owner 122 may have an agreement with the host system 114 whereby content may be shared to non-subscribers of the content owner's services provided that the content owner receives compensation. At step 312, it is determined whether the content may be sold to the user. If not, access to the content is denied at step 314. If there exists an agreement (e.g., implied or express) between the host system 114 and the content owner 122 to sell/share the content, the host system 114 grants access to the content at step 316 for a fee. The agreement may provide the terms and conditions for activities such as which entity (e.g., host system 114, content owner 122) handles the billing and accounting procedures for the transaction. The terms and conditions may also include digital rights management roles and responsibilities of the entities 114 and 122. At step 318, the user is billed for the content. In exemplary embodiments, the content storage and selection application tracks this activity and bills the requesting party for the content and content storage and compensates the content owner 122.

According to exemplary embodiments, the content storage and selection system provides content storage system monitoring, management, and off-site storage services. The content storage and selection system also facilitates the creation and management of content libraries, browsing and acquisition of content from a third-party content library, and security features. The storage may apply to any type of content such as documents, text files, email, images, video, sound, and multimedia. A customer (e.g., an individual that subscribes to a content service such as a cable television service, a satellite television service, an Internet service, etc.) may receive content from the content provider in accordance with a service plan (e.g., basic cable service with limited channels, extended cable with selected premium channels, Internet service and messaging, etc.).

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for managing content storage and selection, comprising:

monitoring, remotely by an off-site host system, consumption of a storage space, of an at least one consumer user content device residing locally in a consumer user system, with respect to storage capacity in the at least one consumer user content device receiving content from a content provider, where the at least one consumer user content device contains a fixed amount of storage space;

selecting content contained in the storage space for relocation, wherein the content for relocation is selected based on at least one of how long the content has been stored in the storage device, size of the content, a content device user's selection, and an inference based upon most frequently accessed content;

relocating, remotely by the off-site host system, the content contained in the fixed amount of storage space of the at least one consumer user content device when a predetermined condition is met, where relocating the content frees up the fixed amount of storage space of the at least one consumer user content device;

building a content library listing content contained in the storage space of the at least one consumer user content device and the relocated content, wherein a content storage and selection application maintains a single copy of a content item in a database and replicates the single copy for each user content device that includes the content item in its content library;

associating the content library with a user account;

providing access to the content library;

providing access to the relocated content;

monitoring a plurality of activities conducted by a content device user via transactions occurring in the content library associated with the content device user;

comparing the plurality of activities conducted by the content device user with a plurality of other activities conducted by users of other content devices via transactions occurring in corresponding content libraries of the other content devices;

determining relationships between the plurality of activities conducted by the content device user and the plurality of other activities conducted by users of other content devices;

generating a listing of recommended content items based on determined relationships; and presenting the listing, to the content device user, wherein access to the content library includes providing an owner of the user account and a non-owner of the user account with access to the content library associated with the user account, wherein access by the non-owner includes at least one of:

viewing listings in the content library, accessing content identified in the content library, adding content to an other content library associated with the non-owner, charging a fee for accessed content, and compensating a content owner for accessed content.

2. The method of claim 1, wherein the relocating content contained in the storage space includes:

removing the content from the storage space; and providing a link in the content library to the relocated content removed from the storage space, the link providing access to the relocated content.

3. The method of claim 1, wherein the content includes at least one of:

audio;
video;
images;
text;
premium channel programming;
cable programming;
broadcast network programming;
radio programming;
digital music; and
pay-per-view programming.

4. The method of claim 1, wherein the providing access to the relocated content is restricted based upon at least one of:

validation of a user identification and password;

validation of a security token, the security token operable for authenticating a content viewer and a recording device;

a recording device identifier linked to a user account; and a transmission medium linked to a content library.

5. A system for managing content storage and selection activities, comprising:

an off-site database for storing content;

an interface to an at least one consumer user content device receiving content from a content provider over a communications network; and an off-site host system, remotely monitoring, via a content storage and selection application, consumption of a storage space, of the at least one consumer user content device residing locally in a consumer user system, with respect to storage capacity in the at least one consumer user content device; selecting content contained in the storage space for relocation, wherein the content for relocation is selected based on at least one of how long the content has been stored in the storage device, size of the content, a content device user's selection, and an inference based upon most frequently accessed content; relocating, remotely by the off-site host system, the content contained in the storage space of the at least one consumer user content device to the off-site database via the communications network when a predetermined condition is met; building a content library listing the content contained in the storage space and the relocated content, wherein a content storage and selection application maintains a single copy of a content item in a database and replicates the single copy for each user content device that includes the content item in its content library; associating the content library with a user account; providing the content device with access to the relocated content, wherein providing the content device with access to the relocated content provides an owner of the user account and a non-owner of the user account with access to the content library associated with the user account;

monitoring a plurality of activities conducted by a content device user via transactions occurring in the content library associated with the content device user;

comparing the plurality of activities conducted by the content device user with a plurality of other activities conducted by users of other content devices via transactions occurring in corresponding content libraries of the other content devices;

determining relationships between the plurality of activities conducted by the content device user and the plurality of other activities conducted by the other content device users;

generating a listing of recommended content items based on determined relationships; and presenting the listing to the content device user, wherein access by the non-owner includes at least one of:

viewing listings in the content library, accessing content identified in the content library, adding content to an other content library associated with the non-owner, charging a fee for accessed content, and compensating a content owner for accessed content.

6. The system of claim 5, wherein the relocating content contained in the storage space includes:

removing the content from the storage space; and providing a link in the content library to the content relocated from the storage space; the link providing, access to the relocated content.

7. The system of claim 5, wherein the content includes at least one of:

audio;
video;
images;
text;
premium channel programming;
cable programming;
broadcast network programming;
radio programming;
digital music; and
pay-per-view programming.

8. The system of claim 5, wherein the providing access to the relocated content is restricted based upon at least one of:

validation of a user identification and password;

validation of a security token, the security token operable for authenticating a content viewer and a recording device;

a recording device identifier linked to a user account; and a transmission medium linked to a content library.

9. A storage medium encoded with machine-readable program code providing content storage and selection services, the program code including instructions causing a host system to implement a method, comprising:

monitoring, remotely by an off-site system, consumption of a storage space, of an at least one consumer user content device residing locally in a consumer user system, with respect to storage capacity in the at least one consumer user content device receiving content from a content provider, where the at least one consumer user content device contains a fixed amount of storage space;

selecting content contained in the storage space for relocation, wherein the content for relocation is selected based on at least one of how long the content has been stored in the storage device, size of the content, a content device user's selection, and an inference based upon most frequently accessed content;

relocating, remotely by the off site host system, the content contained in the fixed amount of storage space of the at least one consumer user content device to a remote storage device via a communications network when a predetermined condition is met, where relocating the content frees up the fixed amount of storage space of the at least one consumer user content device;

building a content library listing content contained in the storage space of the at least one consumer user content device and the relocated content, wherein a content storage and selection application maintains a single copy of a content item in a database and replicates the single copy for each user content device that includes the content item in its content library;

associating the content library with a user account;

providing access to the content library;

providing access to the relocated content;

monitoring a plurality of activities conducted by a content device user via transactions occurring in the content library associated with the content device user;

comparing the plurality of activities conducted by the content device user with a plurality of other activities conducted by users of a plurality of other content devices via transactions occurring in corresponding content libraries of the plurality of other content devices;

determining relationships between the activities conducted by the content device user and the plurality of other activities conducted by the other content device users;

generating a listing of recommended content items based on determined relationships; and presenting the listing to the content device user, wherein providing access to the relocated content provides an owner of the user account and a non-owner of the user account with access to the content library associated with the user account, and wherein access by the non-owner includes at least one of:

viewing listings in the content library, accessing content identified in the content library, adding content to an other content library associated with the non-owner, charging a fee for accessed content, and compensating a content owner for accessed content.

\* \* \* \* \*